(12) United States Patent
Chen et al.

(10) Patent No.: US 7,965,603 B2
(45) Date of Patent: Jun. 21, 2011

(54) METHOD OF ADJUSTING WRITE STRATEGY OF RECORDABLE DISC

(75) Inventors: Ling-Feng Chen, Hsinchu (TW); Yi-Hsueh Lee, Hsinchu (TW); Shih-Kai Weng, Hsinchu (TW); Chao-Wen Hu, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 786 days.

(21) Appl. No.: 12/019,501

(22) Filed: Jan. 24, 2008

(65) Prior Publication Data

US 2008/0186818 A1  Aug. 7, 2008

(30) Foreign Application Priority Data

Feb. 6, 2007 (TW) ................ 96104319 A

(51) Int. Cl.
*G11B 7/00* (2006.01)

(52) U.S. Cl. .................. 369/59.12; 369/47.53

(58) Field of Classification Search ................ 369/59.12
See application file for complete search history.

(56) References Cited

U.S. PATENT DOCUMENTS

| | | | |
|---|---|---|---|
| 7,301,877 B2 * | 11/2007 | Ogawa | 369/59.23 |
| 2005/0058047 A1 * | 3/2005 | Fujita et al. | 369/59.11 |
| 2006/0262709 A1 * | 11/2006 | Kakimoto et al. | 369/121 |

\* cited by examiner

*Primary Examiner* — Jorge L Ortiz Criado
(74) *Attorney, Agent, or Firm* — WPAT, PC; Justin King

(57) ABSTRACT

A method of adjusting a write strategy of a recordable disc comprises steps of: generating a test pattern on a power calibrating area of the recordable disc according to a first write strategy and a first write power; establishing a Pit-to-Land Inter-Symbol Interference table and a Land-to-Pit Inter-Symbol Interference table through measuring a plurality of Pits and Lands with different time lengths in the test pattern; and generating a second overdrive power by adjusting a first overdrive power of the first write strategy according to the Pit-to-Land Inter-Symbol Interference table and the Land-to-Pit Inter-Symbol Interference table.

4 Claims, 5 Drawing Sheets

| Land→Pit | Pit / Land | 3T | 4T | 5T | 6T | 7T | 8T | 9T | 10T | 11T |
|---|---|---|---|---|---|---|---|---|---|---|
| | 3T | a33 | a34 | a35 | a36 | a37 | a38 | a39 | a310 | a311 |
| | 4T | a43 | a44 | a45 | a46 | a47 | a48 | a49 | a410 | a411 |
| | 5T | a53 | a54 | a55 | a56 | a57 | a58 | a59 | a510 | a511 |
| | 6T | a63 | a64 | a65 | a66 | a67 | a68 | a69 | a710 | a711 |
| | 7T | a73 | a74 | a75 | a76 | a77 | a78 | a79 | a710 | a711 |
| | 8T | a83 | a84 | a85 | a86 | a87 | a88 | a89 | a810 | a811 |
| | 9T | a93 | a94 | a95 | a96 | a97 | a98 | a99 | a910 | a911 |
| | 10T | a103 | a104 | a105 | a106 | a107 | a108 | a109 | a1010 | a1011 |
| | 11T | a113 | a114 | a115 | a116 | a117 | a118 | a119 | a1110 | a1111 |

| Pit→Land | Land / Pit | 3T | 4T | 5T | 6T | 7T | 8T | 9T | 10T | 11T |
|---|---|---|---|---|---|---|---|---|---|---|
| | 3T | b33 | b34 | b35 | b36 | b37 | b38 | b39 | b310 | b311 |
| | 4T | b43 | b44 | b45 | b46 | b47 | b48 | b49 | b410 | b411 |
| | 5T | b53 | b54 | b55 | b56 | b57 | b58 | b59 | b510 | b511 |
| | 6T | b63 | b64 | b65 | b66 | b67 | b68 | b69 | b710 | b711 |
| | 7T | b73 | b74 | b75 | b76 | b77 | b78 | b79 | b710 | b711 |
| | 8T | b83 | b84 | b85 | b86 | b87 | b88 | b89 | b810 | b811 |
| | 9T | b93 | b94 | b95 | b96 | b97 | b98 | b99 | b910 | b911 |
| | 10T | b103 | b104 | b105 | b106 | b107 | b108 | b109 | b1010 | b1011 |
| | 11T | b113 | b114 | b115 | b116 | b117 | b118 | b119 | b1110 | b1111 |

_US 7,965,603 B2_

1

METHOD OF ADJUSTING WRITE STRATEGY OF RECORDABLE DISC

FIELD OF THE INVENTION

The present invention relates to a method of adjusting a write strategy of a recordable disc, and more particularly to a method of adjusting a write strategy of a recordable disc by using an ISI table (Inter-Symbol Interference table).

BACKGROUND OF THE INVENTION

Generally, there is a PCA (Power Calibrating Area) on a recordable disc. After the recordable disc is loaded into an optical disc burner for data writing, an optical pickup of the optical disc burner is moved to the PCA for executing an OPC procedure (Optimal Power Calibrating procedure). The OPC procedure is for generating an optimal write power, and then the optical disc burner can process the data writing to the recordable disc according to the optimal write power.

It is understood that data is recorded on spiral tracks of the recordable disc. In another word, the data must be encoded by a control chip of the optical disc burner first, and then the optical disc burner can drive a laser diode of the optical pickup to alternatively generate marks and non-marks on the spiral tracks of the recordable disc according to the signals of the encoded data. The non-marks recorded on the recordable disc are defined as Lands, and the marks are defined as Pits. Accordingly, when the OPC procedure is executed, the optical disc burner can drive the optical pickup to generate a test pattern constructed by a plurality of Lands and Pits.

FIG. 1 is a diagram illustrating a write strategy of a DVD recordable disc. Because the thermal diffusion may cause the actual length of the Pit 10 greater than a designed value, for making the length of Pit 10 (nT, n=3~11) more accurate, the rising edge of a driving signal derived by the laser diode is designed to delay by a front-edge delay time ($t_{n1}$), and the falling edge is designed to advance by a rear-edge advance time ($t_{n2}$). Moreover, an overdrive power (Po) is designed to superpose to a write power (Pw) at the initial stage and the later stage of the formation of the Pit 10.

As depicted in FIG. 1, the front-end overdrive power (Po), having a front-end overdrive time ($t_{n3}$), is superposed to the write power (Po) and initiated at the rising edge of the driving signal. The rear-end overdrive power, having a rear-end overdrive time ($t_{n4}$), is superposed to the write power (Po) and ended at the falling edge of the driving signal. By using a 3T Pit as an example, $t_{31}$ is referred as the front-edge delay time of the 3T Pit; $t_{32}$ is referred as the rear-edge advance time of the 3T Pit; $t_{33}$ is referred as the front-end overdrive time of the 3T Pit; and $t_{34}$ is referred as the rear-end overdrive time of the 3T Pit. Generally, the nT Pit 10 (n=3~11) may have different values of the front-edge delay time ($t_{n1}$), the rear-edge advance time ($t_{n2}$), the front-end overdrive time ($t_{n3}$), and the rear-end overdrive time ($t_{n4}$), wherein these front-edge delay time ($t_{n1}$), the rear-edge advance time ($t_{n2}$), the front-end overdrive time ($t_{n3}$), and the rear-end overdrive time ($t_{n4}$) are together defined as a timing parameter set of a write strategy.

Generally, a recordable disc can be distinguished by reading the manufacture ID and the disc ID on the recordable disc. Because different recordable discs, released by different manufacturers or released by a same manufacturer but having different dyes on the data layer of the recordable disc, have different write strategies, therefore, all the recordable discs releases on the market must be collected and to be processed to find their corresponding parameters by using a verifying procedure. The verifying procedure is referred as a process of adjusting the overdrive power (Po) and the timing parameter set according to each manufacture ID and disc ID, and then storing the adjusted overdrive power (Po) and the adjusted timing parameter set to a read-only memory (ROM) of the optical disc burner. In another word, when a recordable disc is loaded in the optical disc burner for data writing, the optical disc burner can obtain the overdrive power (Po) and the timing parameter set from the read-only memory (ROM) according to the manufacture ID and the disc ID recorded on the track of the loaded recordable disc, and then the optical disc burner defines a write strategy (with uncertain write power) of the recordable disc according to the overdrive power (Po) and the timing parameter set. The write strategy is then used on the PCA for the OPC procedure. Alternatively, if the optical disc burner cannot find a matched manufacture ID or disc ID in the read-only memory (ROM) when the recordable disc is loaded, a standard overdrive power (Po) and a standard timing parameter set will be provided to the optical disc burner for defining a write strategy (with uncertain write power), and the write strategy is then used on the PCA for the OPC procedure.

The OPC procedure is to find the optimal write power (Pw) for combining the overdrive power (Po) and the timing parameter set to define the write strategy. In other words, the OPC procedure is for generating a plurality of test patterns on the PCA via providing a plurality of different write powers to the write strategy. The optical disc burner can obtain an optimal write power through measuring these test patterns, and then defines a write strategy according to the optimal write power (Pw), the overdrive power (Po), and the timing parameter set. The write strategy is then used by the optical disc burner for generating Pits and Lands with different time lengths on the program area of the recordable disc.

Conventionally, the overdrive powers (Po) and the timing parameter sets of write strategies for all the recordable discs released on the market are adjusted and stored in the read-only memory (ROM) of the optical disc burner before the optical disc burner is published to the market; and the OPC procedure executed on the PCA is only used for generating an optimal write power.

However, if a specific recordable disc, which is already released on the market, requires some modifications, the overdrive power (Po) and the timing parameter set used for the original recordable disc which is stored in the read-only memory (ROM) of the optical disc burner may not be useful to the write strategy of the modified recordable disc. If using an original overdrive power (Po) and an original timing parameter set to the modified recordable disc, a poor write quality or even a fail data reading may be resulted in. If using a standard overdrive power (Po) and a standard timing parameter set to a recordable disc when the disc ID of the recordable disc cannot be contained in the read-only memory (ROM) of the optical disc burner, the poor write quality may be still resulted in. Therefore, providing a dynamically adjusting method for an overdrive power (Po) and a timing parameter set of a recordable disc is the main purpose of the present invention.

SUMMARY OF THE INVENTION

Therefore, the present invention discloses a method of adjusting a write strategy of a recordable disc. In the present invention, an optimal write power and an optimal write strategy can be obtained through an OPC procedure executed an optical disc burner.

Moreover, the present invention provides a method of adjusting a write strategy of a recordable disc, comprising steps of: generating a test pattern on a power calibrating area of the recordable disc according to a first write strategy and a first write power; establishing a Pit-to-Land Inter-Symbol Interference table and a Land-to-Pit Inter-Symbol Interference table through measuring a plurality of Pits and Lands with different time lengths in the test pattern; and generating a second overdrive power by adjusting a first overdrive power of the first write strategy according to the Pit-to-Land Inter-Symbol Interference table and the Land-to-Pit Inter-Symbol Interference table.

Moreover, the present invention provides a method of adjusting a write strategy of a recordable disc, comprising steps of: generating a plurality of Pits and Lands with different time lengths on the recordable disc according to a first write strategy and a first write power; establishing a Pit-to-Land Inter-Symbol Interference table and a Land-to-Pit Inter-Symbol Interference table by measuring the plurality of Pits and Lands; and generating a second overdrive power by adjusting a first overdrive power of the first write strategy according to the Pit-to-Land Inter-Symbol Interference table and the Land-to-Pit Inter-Symbol Interference table.

BRIEF DESCRIPTION OF THE DRAWINGS

The present invention can be fully understood from the following detailed description and preferred embodiment with reference to the accompanying drawings in which.

DETAILED DESCRIPTION OF THE PREFERRED EMBODIMENTS

Figure 1:
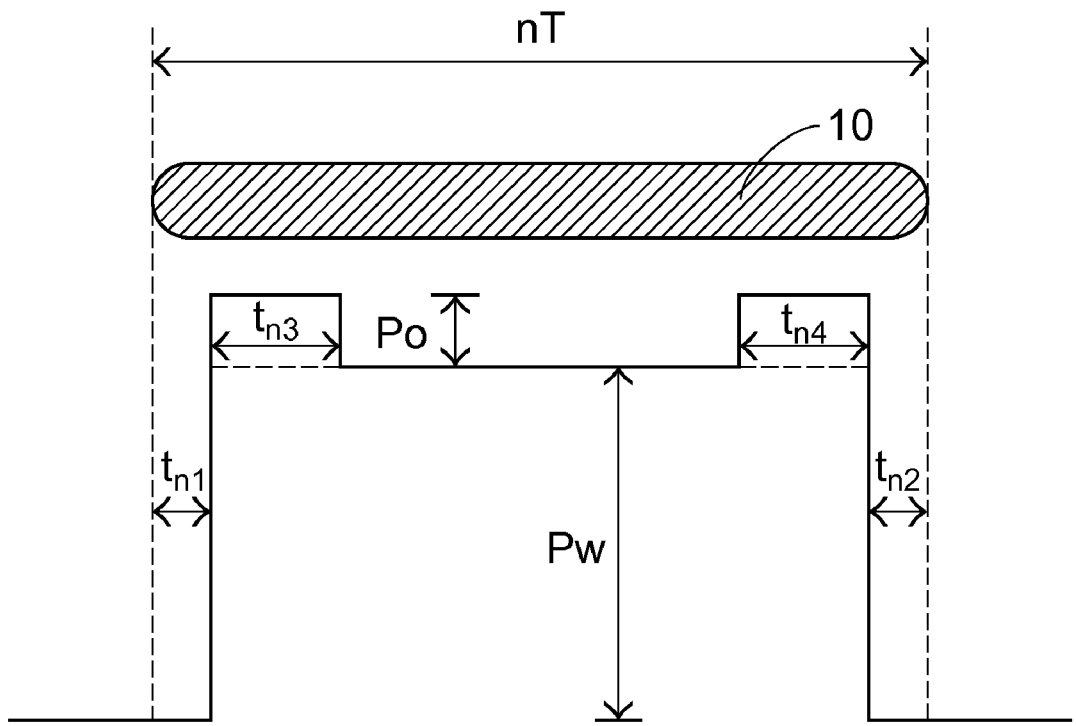
FIG. 1 is a diagram illustrating a write strategy of a DVD recordable disc.
Figure 2A:
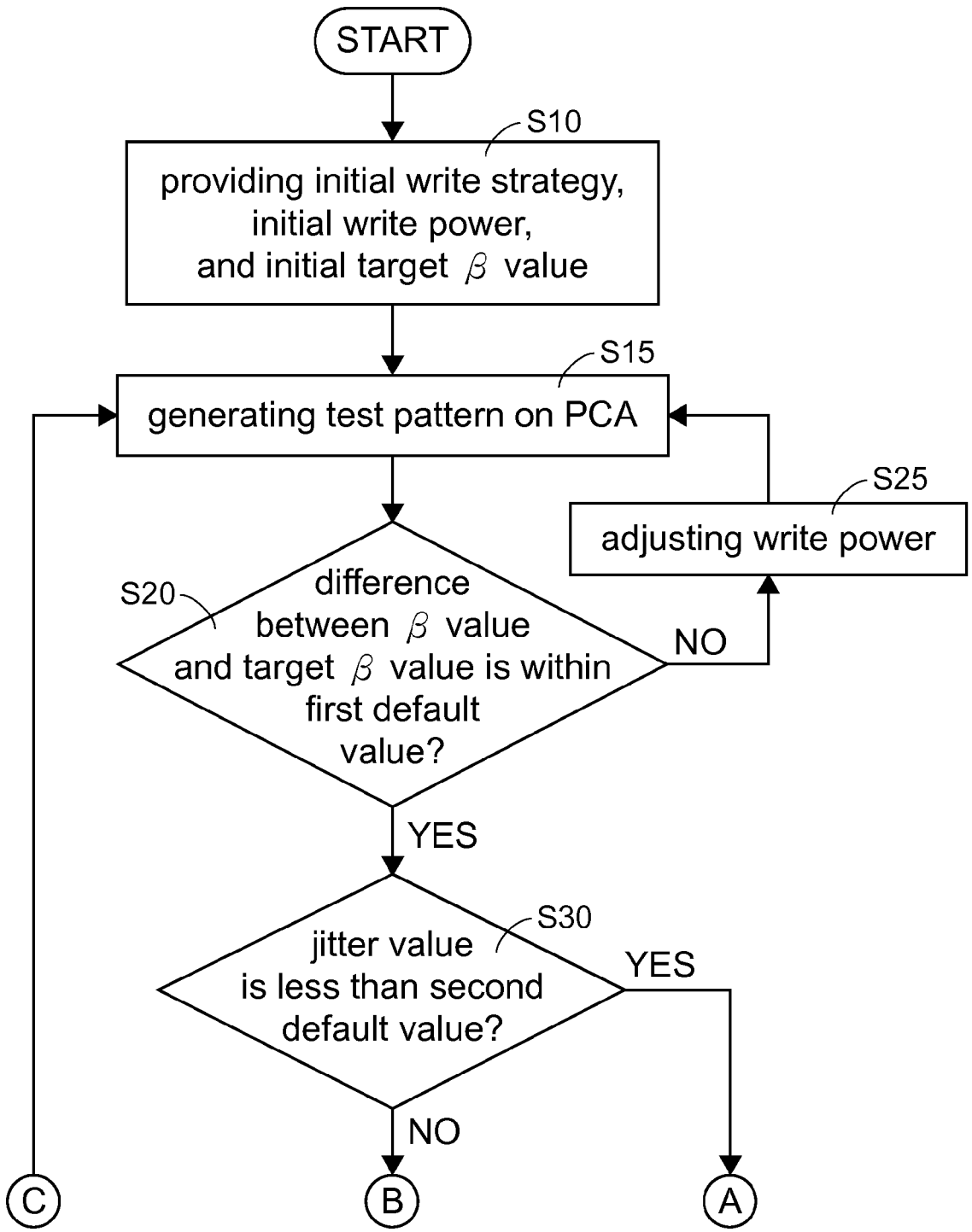
FIGS. 2A and 2B are flow charts showing the method of adjusting a write strategy of a recordable disc of the present invention.
Figure 2B:
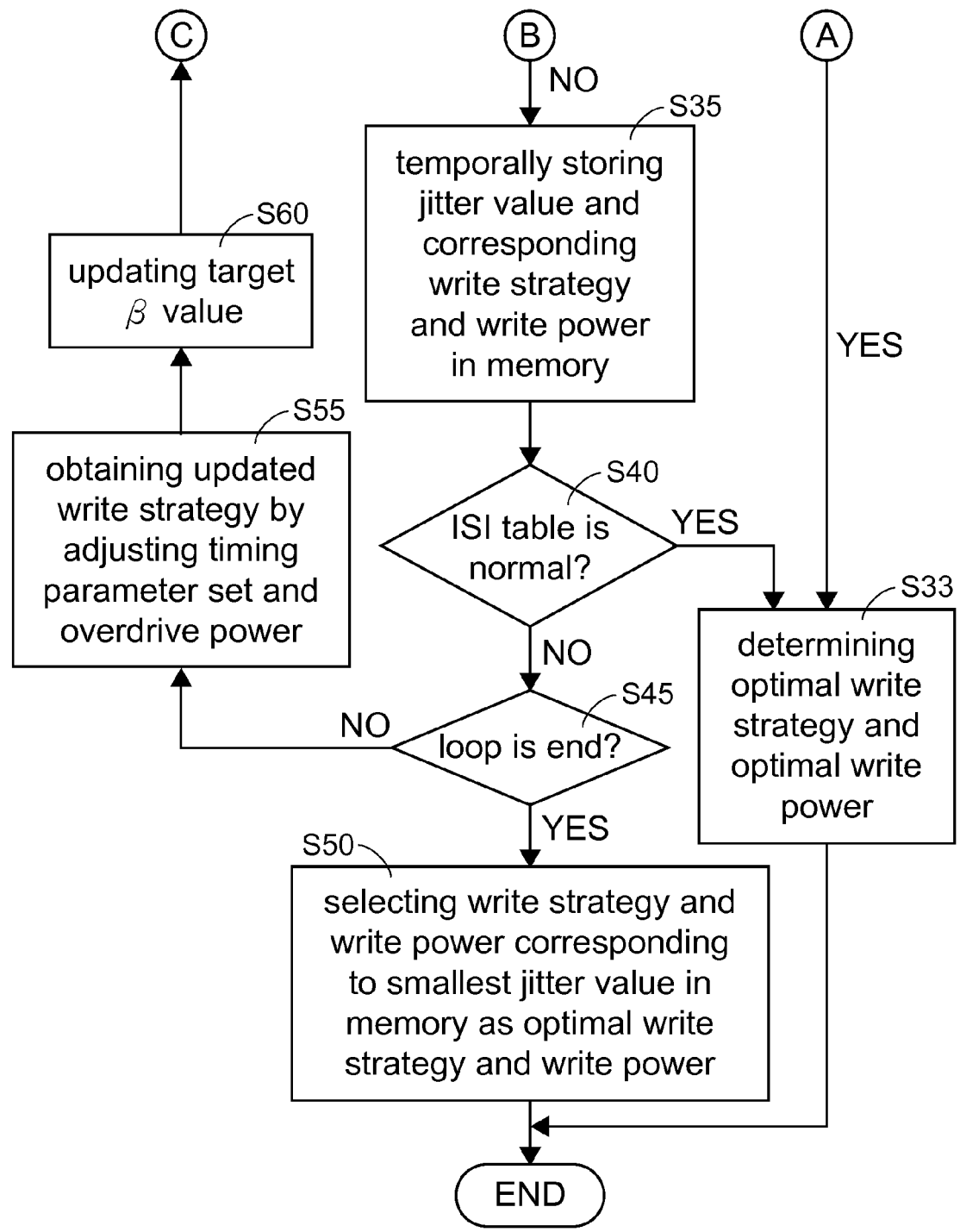

FIGS. 2A and 2B are flow charts showing the method of adjusting a write strategy of a recordable disc of the present invention. When a recordable disc is loaded in an optical disc burner, the optical disc burner can define an initial write strategy according to an overdrive power (Po) and a timing parameter set which are obtained from a read-only memory (ROM) according to a manufacture ID and a disc ID of the recordable disc, and the optical disc burner also provide an initial write power and a target β value (step S10). At this step, the optical disc burner may provide an initial write strategy defined from a standard overdrive power (Po) and a standard timing parameter set from the read-only memory (ROM) if the optical disc burner cannot find the matched disc ID of the loaded recordable disc in the read-only memory (ROM).

Afterward, the optical disc burner then uses the initial write strategy and the initial write power (Pw) to generate a test pattern on the PCA (step S15). The optical disc burner can obtain a β value through measuring the test pattern. In another word, the β value is derived from the calculation of the symmetry analysis of the reflecting signal from the test pattern. If the difference between the calculated β value and a target β value is greater than a first default value (step S20), then the method of the present invention moves to step S25 for further adjusting the write power (Pw). Alternatively, the method of the present invention moves to step S30 for comparing a jitter value of the recordable disc if the difference between the calculated β value and the target β value is within the first default value (step S20). In an embodiment of the present invention, the first default value is defined to ±1%. In another word, the write power (Pw) needs to be further adjusted if the difference between the calculated β value and the target β value is greater than ±1%; alternatively, the write power (Pw) is acceptable if the difference between the calculated β value and the target β value is located within ±1%. At step S25, the optical disc burner will increase the write power (Pw) if the calculated β value is less than the target β value; alternatively, the optical disc burner will decrease the write power (Pw) if the calculated β value is greater than the target β value.

At step S30 of comparing the jitter value, firstly the optical disc burner needs to measure a jitter value of the reflecting signal from the test pattern. If the calculated jitter value is less than a second default value (step S30), then the method of the present invention moves to step S33 for determining the current write strategy and the current write power as an optimal write strategy and an optimal write power, and ends the flow steps of adjusting the write strategy. In the embodiment of the present invention, the second default value is defined to 9%. In another word, the write power (Pw) and the write strategy are determined and defined as the optimal write power and the optimal write strategy if the calculated jitter value is less than 9%; alternatively, the write power (Pw) and the write strategy need to be further adjusted if the calculated jitter value is greater than 9%, and the method of the present invention then moves to step S35.

At step S35, the write strategy, the write power (Pw), and the calculated jitter value are temporarily stored in the read-only memory (ROM) of the optical disc burner. Then, the method of the present invention moves to step S40 for inspecting an ISI table (Inter-Symbol Interference table).

Figures 3A, 3B, 3C:
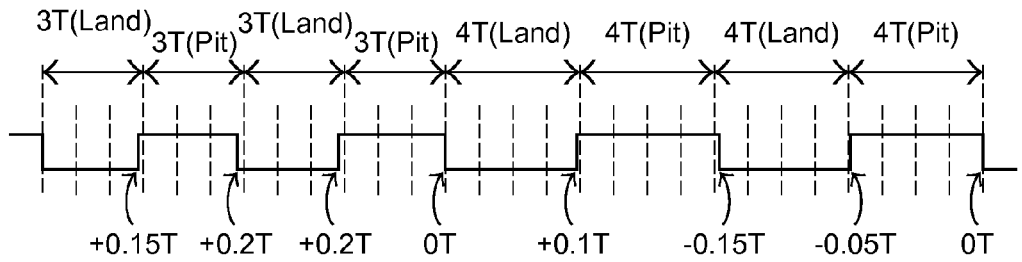
FIG. 3A is a diagram illustrating an electric signal of a test pattern.
FIG. 3B is a diagram showing a Land-to-Pit ISI tables.
FIG. 3C is a diagram showing a Pit-to-Land ISI tables.

FIG. 3A is a diagram illustrating an electric signal of a test pattern. FIGS. 3B and 3C are diagrams showing the ISI tables. Generally, the test pattern generated on the PCA is constituted by a plurality of Pits and Lands with different time lengths (3T~11T). And for convenience, the test pattern illustrated in FIG. 3A is only constituted by Pits and Lands with time lengths 3T and 4T. After the test pattern is generated on the PCA by the write power (Pw), an ISI table for indicating the difference between the actual and the optimal positions of the Pits and Lands can be established through analyzing the electric signal obtained from the test pattern. As depicted in FIG. 3A, the test pattern is sequentially constituted by a 3T Land, a 3T Pit, a 3T Land, a 3T Pit, a 4T Land, a 4T Pit, a 4T Land, a 4T Pit . . . The ISI table can be further divided into a Land-to-Pit ISI table and a Pit-to-Land ISI table shown in FIG. 3B and FIG. 3C, respectively.

As depicted in FIG. 3A, the converting position is advanced 0.15T when the 3T Land is converted to the 3T Pit, therefore, the parameter a33 in the Land-to-Pit ISI table of FIG. 3B is +0.15T. Afterward, the converting position is advanced 0.2T when the 3T Pit is converted to the 3T Land, therefore, the parameter b33 in the Pit-to-Land ISI table of FIG. 3C is +0.2T, and the actual time length of the 3T Pit is 2.95T. Afterward, the converting position is advanced 0.2T when the 3T Land is converted to the 3T Pit, therefore, the parameter a33 in the Land-to-Pit ISI table of FIG. 3B is updated to (+0.15T+0.2T)/2=+0.125T. Afterward, the converting position is no any delay or advance when the 3T Pit is converted to the 4T Land, therefore, the parameter b34 in the Pit-to-Land ISI table of FIG. 3C is 0T, and the actual time length of the 3T Pit is 3.2T. Afterward, the converting position is advanced 0.1T when the 4T Land is converted to the 4T Pit, therefore, the parameter a44 in the Land-to-Pit ISI table of FIG. 3B is +0.1T. Afterward, the converting position is delayed 0.15T when the 4T Pit is converted to the 4T Land, therefore, the parameter b44 in the Pit-to-Land ISI table of FIG. 3C is −0.15T, and the actual time length of the 4T Pit is 4.25T. Afterward, the converting position is delayed 0.05T when the 4T Land is converted to the 4T Pit, therefore, the parameter a44 in the Land-to-Pit ISI table of FIG. 3b is updated to (+0.1T−0.05T)/2=+0.025T, and the actual time length of the 4T Pit is 3.95T. Accordingly, the averaged-actual time length of the 3T Pit illustrated in FIG. 3A is (2.95T+3.2T)/2=3.075T, and the averaged-actual time length of the 4T Pit illustrated in FIG. 3A is (4.25T+3.95T)/2=4.1T.

Because an actual test pattern includes a plurality of Pits and Lands with different time lengths (3T~11T), therefore, a complete Land-to-Pit ISI table of FIG. 3B and a complete Pit-to-Land ISI table of FIG. 3C can be established after all the Pits and Lands in the test pattern are measured and analyzed, so as the difference between the actual and the optimal positions of Pits and Lands, for the following steps of adjusting the write strategy, can be determined according to the ISI table.

At step S40 of FIG. 2, the parameters a33~a1111 and b33~b1111 respectively in the Land-to-Pit ISI table of FIG. 3B and the Pit-to-Land ISI table of FIG. 3C are inspected for determining if the ISI table is normal or not. Generally, the ISI table is determined to normal if all the parameters in the Land-to-Pit ISI table and the Pit-to-Land ISI table are less than a third default value; wherein the third default value is designed to T/12, T/16, or T/32 in the embodiment of the present invention. A normal ISI table at step S40 represents a limit space for improving the write power (Pw) and the write strategy; therefore, the write power (Pw) and the write strategy are respectively determined as the optimal write power and the optimal write strategy (step S33). Alternatively, the method of the present invention moves to step S45 for determining a loop counting number if the ISI table is determined to not normal (step S40). The write strategy needs to be further adjusted (step S55) if the loop counting number is less than a default number.

If the ISI table is determined to not normal (step S40) but the loop counting number is greater than the default number (step S45), a corresponding write power (Pw) and a corresponding write strategy of the smallest jitter value will be respectively selected as the optimal write power and the optimal write strategy if the time consuming of the OPC procedure is concerned. In the embodiment of the present invention, the default number is designed to 12. In another word, the write power (Pw) and the write strategy, corresponding to the smallest jitter value among the 12 jitter value, are selected as the optimal write power and the optimal write strategy (step S50) even the ISI table is still determined to not normal but the loop counting number already reaches to 12.

If the ISI table is determined to not normal and the loop counting number is less than the default number, the method of the present then moves to step S55 for getting an updated write strategy through adjusting the timing parameter set and the overdrive power (Po).

The following description is about the adjusting of the timing parameter set. The timing parameter set can be adjusted according to the ISI table, wherein the timing parameter set includes the front-edge delay time ($t_{n1}$), the rear-edge advance time ($t_{n2}$), the front-end overdrive time ($t_{n3}$), and the rear-end overdrive time ($t_{n4}$) with different time lengths nT (n=3~11). In the present invention, the averaged front-edge error of a 3T Pit is $$\sum_{n=3}^{11} a_{n3}/9;$$

the average front-edge error of a 4T Pit is $$\sum_{n=3}^{11} a_{n4}/9;$$

and all the other averaged front-edge errors with different time lengths can be obtained by the same way. Similarly, the averaged rear-edge error of a 3T Pit is $$\sum_{n=3}^{11} a_{3n}/9;$$

the averaged rear-edge error of a 4T Pit is $$\sum_{n=3}^{11} a_{4n}/9;$$

and all the other averaged rear-edge errors with different time lengths can be obtained by the same way. In the present invention, the front-edge delay time ($t_{31}$) and the rear-edge advance time ($t_{32}$) of the updated 3T Pit write strategy can be determined by the averaged front-edge error, the averaged rear-edge error, and the averaged actual time length of the 3T Pit; the front-edge delay time ($t_{41}$) and the rear-edge advance time ($t_{42}$) of the updated 4T Pit write strategy can be determined by the averaged front-edge error, the averaged rear-edge error, and the averaged actual time length of the 4T Pit. According to the same way, all the front-edge delay times and the rear-edge advance times of the updated nT Pit write strategy (n=5~11) can be determined by the averaged front-edge error, the averaged rear-edge error, and the averaged actual time length of the nT Pit (n=5~11). For example, if the averaged front-edge error of a 3T Pit is +0.1T; the averaged rear-edge error of a 3T Pit is −0.2T; and the actual time length of a 3T Pit is 3.3T; then the front-edge delay time ($t_{31}$) of the updated 3T Pit write strategy can be adjusted to more delayed 0.1T than the original front-edge delay time, the rear-edge advance time ($t_{32}$) of the updated 3T Pit write strategy can be adjusted to more advance 0.2T than the original rear-edge advance time. Accordingly, the averaged actual time length of the updated 3T Pit is closer to 3T, so as the averaged front-edge error and the averaged rear-edge error of the updated 3T Pit are closer to 0. Similarly, all the other front-edge delay time ($t_{n1}$) and the rear-edge advance time ($t_{n2}$) with different time lengths can be adjusted according to the same way.

The following description is about the adjusting of the front-end overdrive time ($t_{n3}$) and the rear-end overdrive time ($t_{n4}$) in the timing parameter set. In the present invention, the front-end overdrive time ($t_{33}$) and the rear-end overdrive time ($t_{34}$) of a 3T Pit can be updated according to the averaged front-edge error of the 3T Pit $$\sum_{n=3}^{11} a_{n3}/9$$

and the averaged rear-edge error of the 3T Pit $$\sum_{n=3}^{11} a_{3n}/9.$$

Similarly, the front-end overdrive time ($t_{43}$) and the rear-end overdrive time ($t_{44}$) of a 4T Pit can be updated according to the averaged front-edge error of the 4T Pit $$\sum_{n=3}^{11} a_{n4}/9$$

and the averaged rear-edge error of the 4T Pit $$\sum_{n=3}^{11} a_{4n}/9.$$

According to the same way, all the front-end overdrive time and the rear-end overdrive time of the nT Pit (n=5~11) can be updated according to the averaged front-edge error and the averaged rear-edge error. In the embodiment of the present invention, the updated front-end overdrive time ($t_{33}$) is the original front-end overdrive time adding to the averaged front-edge error of the 3T Pit $$\sum_{n=3}^{11} a_{n3}/9;$$

the updated rear-end overdrive time ($t_{34}$) is the original rear-end overdrive time adding to the averaged front-edge error of the 3T Pit $$\sum_{n=3}^{11} a_{3n}/9.$$

For example, if the front-end overdrive time of a 3T Pit is 0.5T; the rear-end overdrive time of the 3T Pit is 0.5T; the averaged front-edge error of the 3T Pit is +0.1T; and the averaged rear-edge error of the 3T Pit is −0.1T; then the updated front-end overdrive time ($t_{33}$) of the 3T Pit is 0.5T+0.1T=0.6T, and the updated rear-end overdrive time ($t_{34}$) of the 3T Pit is 0.5T−0.1T=0.4T. Similarly, all the front-end overdrive times and the rear-end overdrive times of Pits with different time lengths can be updated from the same way.

Figure 4:
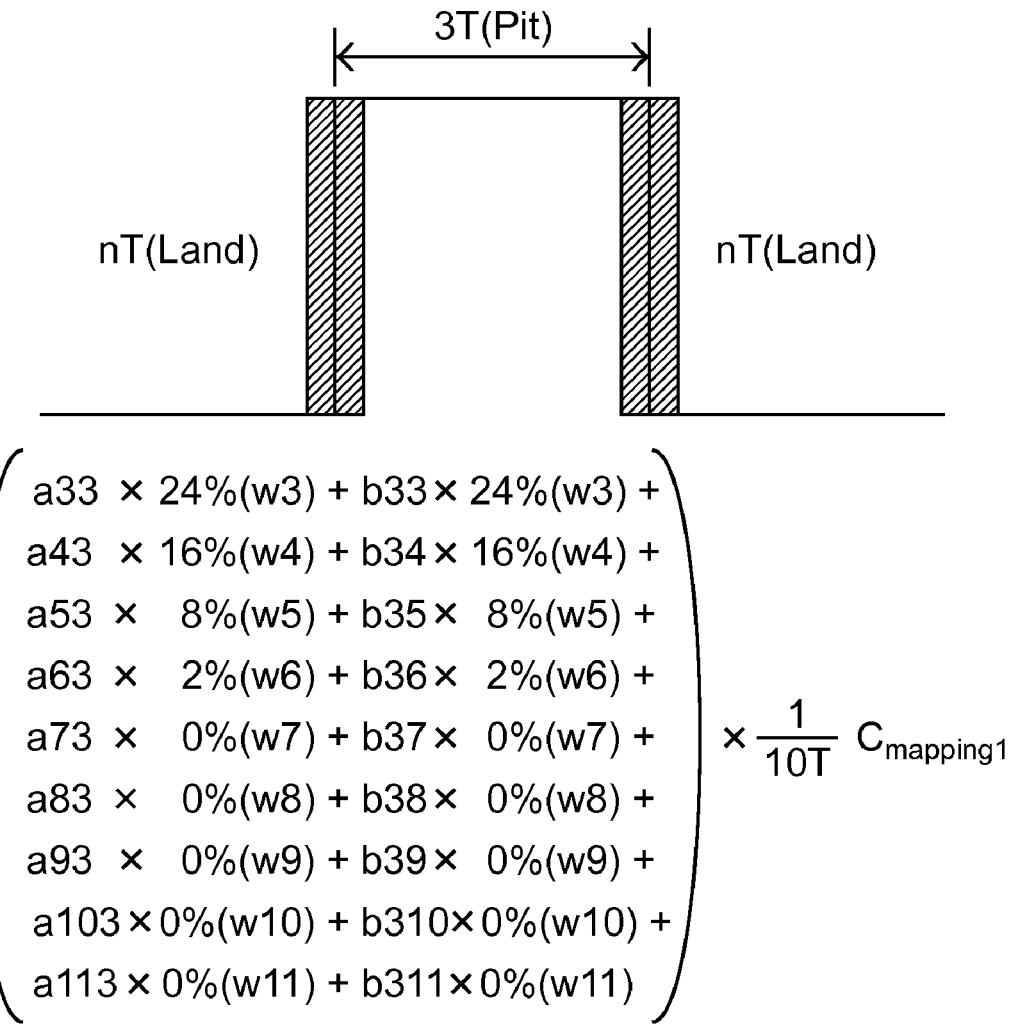
FIG. 4 is a diagram showing a method of adjusting an overdrive power (Po) of a write strategy of the present invention.

The following description is about the adjusting of the overdrive power (Po). Because the overdrive power (Po) plays a critical role of the accuracy of a 3T Pit, all the front-edge errors and all the rear-edge errors of the 3T Pit obtained from the ISI table will be used for updating the overdrive power (Po). FIG. 4 is a diagram showing a method of adjusting an overdrive power (Po) of a write strategy of the present invention. After the Land-to-Pit ISI table of FIG. 3B and the Pit-to-Land ISI table of FIG. 3C are established, the overdrive power can be updated from the equation of:

$$P_{o-updated} = P_o + P_o \cdot \left( \sum_{n=3}^{11} a_{n3} \cdot w_n + \sum_{n=3}^{11} b_{3n} \cdot w_n \right) \cdot C_{mapping1}$$

The parameters a33~a113 in the Land-to-Pit ISI table of FIG. 3B represent all the front-edge errors before the 3T Pit, and the parameters b33~a311 in the Pit-to-Land ISI table of FIG. 3C represent all the rear-edge errors after the 3T Pit. In the present invention, a specific weight is applied to each front-edge error and each rear-edge error of the nT Land (n=3~11) which are right before or right after the 3T Pit. As depicted in FIG. 4, the weight (w3) of a front-edge error of a 3T Land which is right before the 3T Pit is 24%, so as the weight (w3) of a rear-edge error of a 3T Land which is right after the 3T Pit is 24%; the weight (w4) of a front-edge error of a 4T Land which is right before the 3T Pit is 16%, so as the weight (w4) of a rear-edge error of a 4T Land which is right after the 3T Pit is 16%; the weight (w5) of a front-edge error of a 5T Land which is right before the 3T Pit is 8%, so as the weight (w5) of a rear-edge error of a 5T Land which is right after the 3T Pit is 8%; the weight (w6) of a front-edge error of a 6T Land which is right before the 3T Pit is 2%, so as the weight (w6) of a rear-edge error of a 6T Land which is right after the 3T Pit is 2%; the weights (w7~w11) of front-edge errors of nT Land (n=7~11) which are right before the 3T Pit is 0%, so as the weights (w7~w11) of rear-edge errors of nT Land (n=7~11) which are right after the 3T Pit is 0%. It is understood that the weights may be adjusted according to any specific requirement, and the overdrive power obtained from the adjusted weights is closer to optimal.

As depicted in FIG. 4, a first adjusting ratio, to be used for getting the updated overdrive power, is obtained by an adding value multiplied by a first mapping constant, wherein the adding value is a summary of each parameter (a33~a113, b33~b311) multiplied by each corresponding weight. For example, if the adding value is +0.15T and the first mapping constant $C_{mapping1}$ is designed to $\frac{1}{10}$T, therefore, the updated overdrive power can be obtained from the equation of:

$$P_{o-updated} = Po + (+0.15T \times (\tfrac{1}{10}T))Po = Po + (1.5\%)Po$$

As depicted in FIG. 2, the method of the present invention then moves to step S60 for updating the target β value after the write strategy is updated through the updated timing parameter set and the updated overdrive power at step S55.

In the embodiment of the present invention, the target β value can be updated through comparing the front-edge delay time ($t_{31}$) and the rear-edge advance time ($t_{32}$) of the updated 3T Pit write strategy with the front-edge delay time ($t_{n1}$) and the rear-edge advance time ($t_{n2}$) of any other updated nT Pits (n=4~11). For example, if the front-edge delay time ($t_{31}$) of the updated 3T Pit write strategy is 0.6T; the rear-edge advance time ($t_{32}$) of the updated 3T Pit write strategy is 0.4T; the front-edge delay time ($t_{41}$) of the updated 4T Pit write strategy is 0.5T; and the rear-edge advance time ($t_{42}$) of the updated 4T Pit write strategy is 0.6T, then the updated target β value must be adjusted less than the original target β value due to the rear-edge advance time ($t_{32}$) subtracting from the front-edge delay time ($t_{31}$) of the 3T Pit is greater than the rear-edge advance time ($t_{42}$) subtracting from the front-edge delay time ($t_{14}$) of the 4T Pit ([0.6T−0.4T]>[0.5T−0.6T]). A second adjusting ratio, to be used for getting the updated target β value, can be obtained from a subtracting value multiplied to a second mapping constant, wherein the subtracting value is the difference (0.3T) between the rear-edge advance time ($t_{32}$) subtracting from the front-edge delay time ($t_{31}$) and the rear-edge advance time ($t_{42}$) subtracting from the front-edge delay time ($t_{41}$). In the embodiment of the present invention, the second mapping constant $C_{mapping2}$ is designed to $\frac{1}{20}T$. Therefore, the second adjusting ratio is obtained from the equation of $0.3T \times \frac{1}{20}T = 0.015 = 1.5\%$, in another word, the updated target β value is needed to be adjusted smaller 1.5% than the original target β value. Alternatively, the updated target β value is need to be adjusted greater than the original target β value if the rear-edge advance time ($t_{32}$) subtracting from the front-edge delay time ($t_{31}$) is less than the rear-edge advance time ($t_{42}$) subtracting from the front-edge delay time ($t_{41}$).

As depicted in FIG. 2, after the overdrive power (Po), the timing parameter set are updated at step S55, and the target β value is updated at step S60, the method of the present invention then moves back to step S15 for generating a test pattern on the PCA.

In the embodiment of the present invention, both the optimal write power and the optimal write strategy can be obtained by the OPC procedure executed on the PCA. Therefore, the data can be recorded on the recordable disc by the optical disc burner according to the optimal write power and the optimal write strategy, so as the write quality of the recordable disc can be improved efficiently. Moreover, it is understood that the OPC procedure is not limit to execute on the PCA. The OPC procedure can be executed on other area (e.g., program area) for the method of adjusting the write strategy of the present invention.

While the invention has been described with reference to the preferred embodiments, the description is not intended to be construed in a limiting sense. It is therefore contemplated that the appended claims will cover any such modifications or embodiments as may fall within the scope of the invention defined by the following claims and their equivalents.

What is claimed is:

1. A method of adjusting a write strategy of a recordable disc, comprising steps of:
   generating a test pattern on a power calibrating area of the recordable disc according to a first write strategy and a first write power;
   establishing a Pit-to-Land Inter-Symbol Interference table and a Land-to-Pit Inter-Symbol Interference table through measuring a plurality of Pits and Lands with different time lengths in the test pattern, wherein the Land-to-Pit Inter-Symbol Interference table at least includes a plural of front-edge errors from a plural of Lands with different time lengths to a Pit with a time length of 3T and the Pit-to-Land Inter-Symbol Interference table at least includes a plural of rear-edge errors from a Pit with a time length of 3T to a plural of Lands with a different time lengths;
   providing a weight to each front-edge error and each rear-edge error;
   determining an adjusting ratio of a first overdrive power by multiplying a mapping constant by a summary of all the front-edge errors and the rear-edge errors with the weights; and
   generating a second overdrive power by adjusting the first overdrive power of the first write strategy according to the adjusting ratio.

2. The method according to claim 1, wherein the second overdrive power is the first overdrive power adding to a value of the adjust ratio multiplied by the first overdrive power.

3. A method of adjusting a write strategy of a recordable disc, comprising steps of:
   generating a plurality of Pits and Lands with different time lengths on the recordable disc according to a first write strategy and a first write power;
   establishing a Pit-to-Land Inter-Symbol Interference table and a Land-to-Pit Inter-Symbol Interference table by measuring the plurality of Pits and Lands, wherein the Land-to-Pit Inter-Symbol Interference table at least includes a plural of front-edge errors from a plural of Lands with different time lengths to a Pit with a time length of 3T, and the Pit-to-Land Inter-Symbol Interference table at least includes a plural of rear-edge errors from a Pit with a time length of 3T to a plural of Lands with a different time lengths;
   providing a weight to each front-edge error and each rear-edge error;
   determining an adjusting ratio of a first overdrive power by multiplying a mapping constant by a summary of all the front-edge errors and the rear-edge errors with the weights; and
   generating a second overdrive power by adjusting the first overdrive power of the first write strategy according to the adjusting ratio.

4. The method according to claim 3, wherein the second overdrive power is the first overdrive power adding to a value of the adjust ratio multiplied by the first overdrive power.

* * * * *